3,145,222
ADDITION OF POLYFLUOROALKYL IODIDES TO UNSATURATED COMPOUNDS AND PRODUCTS PRODUCED THEREBY
Neal O. Brace, Wilmington, Del., assignor to E. I. du Pont de Nemours and Company, Wilmington, Del., a corporation of Delaware
No Drawing. Filed Feb. 23, 1961, Ser. No. 90,911
7 Claims. (Cl. 260—408)

This invention is directed to a novel chemical composition and process, said process comprising the free radical catalyzed addition of polyfluoroalkyl iodides of structure A—CFI—B, wherein A and B are chosen from fluorine and $Y(C_nF_{2n})$, Y is fluorine, chlorine, bromine or hydrogen and $n$ is from 1 to about 20, and $I(C_rF_{2r})I$, wherein $r$ is from 3 to about 20, to hydrocarbon olefins or acetylenes to form products of structure

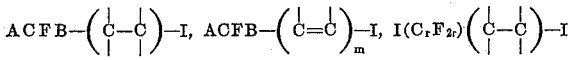

or

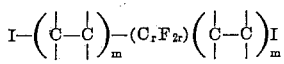

wherein $m$ is an integer, generally equal to one but sometimes larger and only rarely greater than ten. Hydrocarbon olefins or acetylenes may be substituted with a variety of groups but not a plurality of halogen.

It is well known that polyfluoroalkyl iodides are cleaved to free radicals by heat or ultraviolet light and that these radicals add to olefins or acetylenes to form products of type

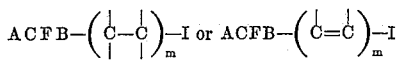

where $m$ is usually one but may be larger. It is also known that such reactions are rather time consuming and inconvenient on a large scale. For instance, Haszeldine (J. Chem. Soc., 1949, 2856) reports that it takes 108 hours to obtain a 46% conversion in the photochemical addition of $CF_3I$ to ethylene and 40 hours at 180° C. to obtain a 7% conversion in the thermal addition of $CF_3I$ to ethylene. Although these are extreme cases, there are many examples of such reactions which require extended periods of time. In many cases, the yields of desired products are low because of side reactions, particularly the thermal or photochemical decomposition of the product iodides.

When commercial application of such reactions is considered (for several products which can be prepared by these additions are industrially useful), it soon becomes apparent that the photochemical or thermal reactions are not feasible. The size of equipment necessary and rates of production possible make the products obtained too expensive. Photochemical processes, in general, are expensive because of the large consumption of electric power. There are recorded instances, also, when both the photochemical and thermal processes fail completely.

It is, therefore, an object of the present invention to provide novel chemical compositions and a novel and economical process for reacting polyfluoroalkyl iodides with hydrocarbon olefins or acetylenes in high conversion and high yield.

It is a further object of this invention to provide a process whereby products can be prepared which cannot be prepared by the thermal or photochemical additions to olefins.

These and other objects will become apparent in the following description and claims.

The objects of the present invention have been attained by the discovery that perfluoroalkyl iodides can be added to olefins in the presence of free-radical generating catalysts to give the addition products in high conversions and yields and that products which cannot be prepared by the thermal or photochemical processes, can be prepared using free radical catalysts as follows.

More specifically, the present invention is directed to a composition having the structure $Y(C_nF_{2n})Q$ wherein Y is selected from the group consisting of hydrogen, fluorine, chlorine and bromine, $n$ is an integer from one to about twenty and Q is selected from the group consisting of (a) —$CH_2CHIO_2CR$,
  (b) —$CH_2CHI(CH_2)_mO(CH_2)_2CO_2H$,
  (c) —$CH=CH(CH_2)_mO(CH_2)_2CO_2H$,
  (d) —$CH_2CH_2(CH_2)_mO(CH_2)_2CO_2H$
and
  (e) —$CH=CI(CH_2)_mCO_2H$ wherein R of (a) is a lower alkyl group and $m$ of (b), (c), (d) and (e) is an integer of from zero to about fourteen.

The present invention is also directed to a process for reacting polyfluoroalkyl iodides with aliphatic olefins and acetylenes to form addition products which comprises heating polyfluoroalkyl iodides chosen from A—CFI—B and $I(C_rF_{2r})I$, where A and B are chosen from fluorine and $Y(C_nF_{2n})$, Y is chosen from fluorine, chlorine, bromine and hydrogen, $n$ is an integer of from one to about twenty and $r$ is an integer of from three to about twenty, with unsaturated compounds chosen from aliphatic olefins and acetylenes in the presence of a free-radical generating compound at temperatures of from about 50° C. to about 190° C. and from about one to about 50 atmospheres pressure and recovering the products from the reaction mixture; wherein said olefins are chosen from $Z_1CH=CZ_2Z_3$, $Z_1$ and $Z_2$ are chosen from hydrogen, alkyl, including wherein $Z_1$ and $Z_2$ are joined together to form a cyclic aliphatic ring system, chloroalkyl, —R'—CH=CH$_2$, —R'—OR, —R'—CO$_2$R,
—R'—CONR$_2$,
—R'—CONR—CH$_2$NR—CO—R'—CH=CH$_2$,
—R'—CN, —R'-aryl, —R'—O$_2$CR,
—R'—OR'—CO$_2$R,

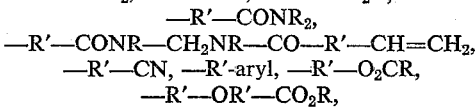

—R'—CH(CO$_2$alkyl)$_2$ and —R'—CO—R'—CO$_2$R, R' is a saturated divalent alkylene bridging group and R is chosen from hydrogen and alkyl, $Z_3$ is chosen from the groups defining $Z_1$ and $Z_2$, —CO$_2$R, —CONR$_2$, aryl, —O$_2$CR'—CH=CH$_2$ and —CCl=CH$_2$, including wherein $Z_2$ and $Z_3$ are joined together to form a cyclic aliphatic ring system, said olefin $Z_1CH=CZ_2Z_3$ containing from two to about thirty carbon atoms and at least one of $Z_1$, $Z_2$ and $Z_3$ is hydrogen; said acetylenes being chosen from $Z_1C\equiv CZ_2$ wherein $Z_1$ and $Z_2$ are as previously defined and said acetylene containing from two to thirty carbon atoms.

Many types of olefins, acetylenes and dienes are useful in the present process. Primarily, the olefins are characterized by having no less than two hydrogens attached to the double-bonded carbons; these may both be attached to one carbon or one to each carbon. There is one other limitation on the olefins, that no more than one halogen, aryl group or other electronegative group is attached to the double-bonded carbons. The following types of olefins have been used:

$C_nH_{2n+1}CH=CH_2$ ($n=5$),
$C_nH_{2n+1}CH=CHC_mH_{2m+1}$ ($n=m=2$),
$C_6H_5(CH_2)_nCH=CH_2$ ($n=1$),

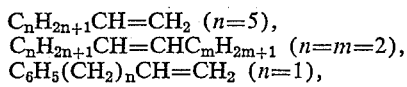 (cyclohexene $d=4$),

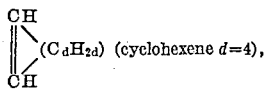 (bicycloheptene $e=5$),

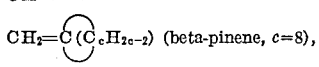 (beta-pinene, $c=8$),

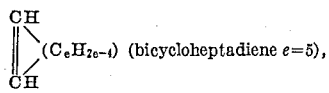 (bicycloheptadiene $e=5$),

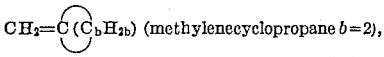 (methylenecyclopropane $b=2$),

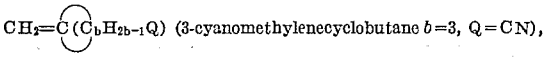 (3-cyanomethylenecyclobutane $b=3$, Q=CN),

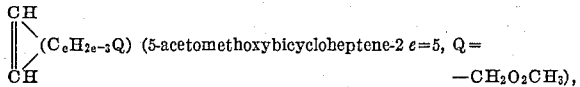 (5-acetomethoxybicycloheptene-2 $e=5$, Q= $-CH_2O_2CH_3$), $CH_2=CHO_2CR$ (R=$CH_3$),
$CH_2=CH(CH_2)_nO_2CR$ ($n=1$ and 9, R=$CH_3$),
$CH_2=CH(CH_2)_m\!-\!O(CH_2)_nCO_2H$ ($m=1$, $n=2$),
$CH_2=CH(CH_2)_nCO_2R$ ($n=1, 2, 3, 8$ and 14; R=H, $C_2H_5$),
$CH_2=CH(CH_2)_nCH(CO_2R)_2$ ($n=1$),
Ethylene,
$CH_2=C(C_nH_{2n+1})_2$ ($n=1$),
$CH_2=CH(CH_2)_mCO(CH_2)_nCO_2H$ ($m=8, n=5$),
$(CH_2=CH(CH_2)_nCONH)_2CH_2$ ($n=8$),
$CH_2=CHCO_2R$ (R=$C_2H_5$),
$CH_2=CH$-aryl (aryl=$C_6H_5$),
$CH_2=CH(CH_2)_mCH(OC_2H_5)_2$ ($m=1$),
$(CH_2=CHCH_2)_2O$,
$CH_2=CH(CH_2)_mO(CH_2)_nOH$ ($m=1$; $n=2$),

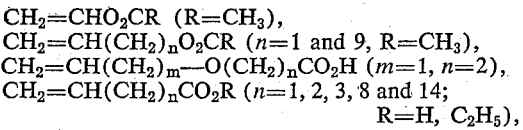 (R=$CH_3$, $n=1$) and

Acetylenes such as $C_2H_2$, $C_nH_{2n+1}C\equiv CH$ ($n=4$),
$HC\equiv C$ aryl (aryl=$C_6H_5$),
$HC\equiv C(CH_2)_nCO_2H$ ($n=0, 8$),
$RC\equiv CR$ (R=$C_2H_5$).

Polyfluoroalkyl iodides useful according to the present invention have the structures ACFIB and $I(C_rF_{2r})I$ wherein A and B are fluorine or $Y(C_nF_{2n})$, Y is fluorine, chloride, bromide or hydrogen. The iodines of $I(C_rF_{2r})I$ are not attached to the same or adjacent carbons. Thus, these iodides include:

$CF_3I$,
$C_nF_{2n+1}CF_2I$ ($n=1-19$),
$C_mF_{2m+1}CFIC_nF_{2n+1}$ ($m+n=2-19$),
$H(C_nF_{2n})CF_2I$ ($n=1-19$),
$C_mF_{2m+1}CFI(C_nF_{2n})H$ ($m+n=2-19$),
$H(C_mF_{2m})CFI(C_nF_{2n})H$ ($m+n=2-19$),
$Cl(C_nF_{2n})CF_2I$ ($n=1-19$),
$C_mF_{2m+1}CFI(C_nF_{2n})Cl$ ($m+n=2-19$),
$H(C_mF_{2m})CFI(C_nF_{2n})Cl$ ($m+n=2-19$),
$Cl(C_mF_{2m})CFI(C_nF_{2n})Cl$ ($m+n=2-19$),
$Br(C_nF_{2n})CF_2I$ ($n=1-19$),
$C_mF_{2m+1}CFI(C_nF_{2n})Br$ ($m+n=2-19$),
$H(C_mF_{2m})CFI(C_nF_{2n})Br$ ($m+n=2-19$),
$Cl(C_mF_{2m})CFI(C_nF_{2n})Br$ ($m+n=2-19$, and
$Br(C_mF_{2m})CFI(C_nF_{2n})Br$ ($m+n=2-19$) as well as the diiodides $I(C_rF_{2r})I$ ($r=3-20$). All of these types of iodides are readily available.

The present process may be carried out in either a batch or continuous manner. While, for small scale preparations, the batch process is more convenient, the continuous process is more useful for commercial operations. The process is carried out at either atmospheric or superatmospheric pressure depending on the reactants. If either iodide or olefin have boiling points below the desired reaction temperature, a pressure system must be used, otherwise the process may be carried out at atmospheric pressure. If either reactant has a critical temperature below the reaction temperature, e.g., ethylene whose critical temperature is 9° C., that reactant will be largely gaseous at the reaction temperature.

The reaction temperature varies considerably depending on the nature of the free-radical generating catalyst being used. Azo catalysts such as alpha,alpha'-azobisisobutyronitrile require relatively low temperatures such as 50 to 80° C. (certain acyl peroxides are even lower, e.g., $(CH_3CO_2)_2$). Benzoyl peroxide requires a somewhat higher temperature, viz. 80 to 100° C., while a dialkyl peroxide such as di-tert-butyl peroxide requires an even more elevated temperature, viz. 120 to 190° C. The catalyst choice depends on several factors. Certain of the products are relatively unstable thermally so a lower reaction temperature is required. At the other extreme, particularly with less reactive unsaturates or iodides, higher reaction temperatures are required. The particular choice of catalyst and temperature depends on the reactants being used.

The polyfluoroalkyl iodides A—CFI—B and $I(C_rF_{2r})I$ are, in many cases, readily available. They are prepared by one or more of the following reactions.

$$C_mF_{2m+1}CF_2CO_2Ag + I_2 \xrightarrow{heat} C_mF_{2m+1}CF_2I + CO_2 + AgI$$

($m=0-19$)

$$Y(C_nF_{2n})CF_2CO_2Ag + I_2 \xrightarrow{heat} Y(C_nF_{2n})CF_2I + CO_2 + AgI$$

(Y=H, Cl or Br, $n=1-19$). See Haszeldine, J. Chem. Soc., 1952, 4259; Brice and Simons, J. Am. Chem. Soc., 73, 4016 (1951).

$$Y(C_nF_{2n})CF_2COCl + KI \xrightarrow{150°} Y(C_nF_{2n})CF_2I + KCl + CO$$

See Krespan, J. Org. Chem., 23, 2016 (1958).

$$Y(C_mF_{2m})CF_2I + Y(C_nF_{2n})CF=CF_2 \xrightarrow[light]{heat\ or}$$
$$Y(C_mF_{2m})CF_2(CF_2CF_2)_pI$$
$$Y(C_mF_{2m})CF_2CF_2CFI(C_nF_{2n})Y$$

(Y=F, Cl, Br or H, both not necessarily the same, $m$ and $n\neq 0$; see Haszeldine, J. Chem. Soc., 1949, 2856; 1953, 376; Hauptschein et al., J. Am. Chem. Soc., 79, 2549 (1957)).

The olefins $Y(C_nF_{2n})CF=CF_2$ are readily available from the corresponding acids $Y(C_nF_{2n})CF_2CF_2CO_2H$ by pyrolysis of the sodium salt. Thus, a wide variety of polyfluoroalkyl iodides are available.

Polyfluoro iodides of type $I(C_rF_{2r})I$ are available from either

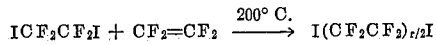
$$ICF_2CF_2I + CF_2=CF_2 \xrightarrow{200°\ C.} I(CF_2CF_2)_{t/2}I$$

or

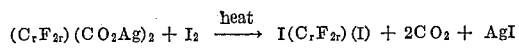
$$(C_rF_{2r})(CO_2Ag)_2 + I_2 \xrightarrow{heat} I(C_rF_{2r})(I) + 2CO_2 + AgI$$

The series of compounds $Br(CF_2CF_2)_nI$ is prepared as follows. One mole of $ICF_2CF_2Br$ and a catalytic amount of azobisisobutyronitrile were placed in a shaker tube and heated to 80° C. Tetrafluoroethylene (one mole) was added in increments over a period of several hours. Fractionation of the resulting product gave the following:

| Compound | B.P./mm. | $n_D^{25}$ | Wt. percent | Relative percent of product |
|---|---|---|---|---|
| $BrCF_2CF_2I$ | 80° | 1.4276 | 79.4 | |
| $Br(CF_2CF_2)_2I$ | 63°/100 | 1.3889 | 12.1 | 61.2 |
| $Br(CF_2CF_2)_3I$ | 75°/50 | 1.3741 | 5.2 | 26.3 |
| $Br(CF_2CF_2)_4I$ | | | 1.6 | 8.1 |
| $Br(CF_2CF_2)_5I$ | | | 0.9 | 4.5 |
| $Br(CF_2CF_2)_6I$ | | | 0.3 | 1.4 |

Analogous results were obtained with $ClCF_2CF_2I$ to obtain the series of products $Cl(CF_2CF_2)_nI$.

The products of the present invention are compounds of structure

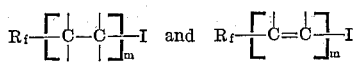
$$R_f \left[ -\overset{|}{C} - \overset{|}{C} - \right]_m I \quad \text{and} \quad R_f \left[ -\overset{|}{C} = \overset{|}{C} - \right]_m I$$

where $R_f$ is the polyfluoroalkyl group. In the great majority of cases $m$ is one; however, with certain highly reactive olefins or acetylenes, $m$ can be greater than one, e.g., $C_6H_5CH=CH_2$, $CH_2=CHCO_2C_2H_5$,

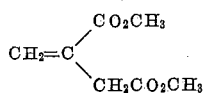
$$CH_2=C\begin{smallmatrix}CO_2CH_3\\CH_2CO_2CH_3\end{smallmatrix}$$

and $C_2H_4$. For the most part, it is desirable that $m$ should be one since the products obtained thereby are valuable for a variety of purposes. For example, reaction of $C_7F_{15}I$ with $CH_2=CH(CH_2)_8CO_2H$ gives $$C_7F_{15}CH_2CHI(CH_2)_8CO_2H$$

which is valuable as a surface active agent. The iodoacid is readily reduced to $C_7F_{15}(CH_2)_{10}CO_2H$ which is also valuable as a surface active agent. (Australian appln. 38,940, June 24, 1958; Canadian Patent 589,703 and U.S. Patent 2,951,051). The reaction of $C_7F_{15}I$ with ethylene may give $C_7F_{15}CH_2CH_2I$ under the proper conditions. Reaction of this iodide with sodium methacrylate gives

$$C_7F_{15}CH_2CH_2O\overset{O}{\overset{\|}{C}}\overset{CH_3}{\overset{|}{C}}=CH_2$$

which forms valuable polymers. The same valuable polymer intermediate may be prepared by reacting $C_7F_{15}I$ with vinyl acetate to give

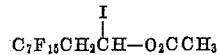
$$C_7F_{15}CH_2\overset{I}{\overset{|}{C}}H-O_2CCH_3$$

reduction of which with zinc and acid gives $$C_7F_{15}CH_2CH_2OH$$

which is then esterified with methacrylic acid. Other valuable products are obtained by reacting $C_3F_7I$ with β-pinene, which gives

$$C_3F_7CH_2-\langle\phantom{O}\rangle-CI(CH_3)_2$$

Dehydrogenation of this product by standard methods (which is accompanied by reductive removal of the iodine) gives

$$C_3F_7CH_2-\langle\phantom{O}\rangle-CH(CH_3)_2$$

a valuable perfluoroalkyl-aromatic compound. The addition of $C_3F_7I$ to allyl acetate gives $$C_3F_7CH_2CHICH_2O_2CCH_3$$

which, on hydrolysis and treatment with alkali, gives

$$C_3F_7CH_2C\overset{O}{\overset{/\ \ \backslash}{H-}}CH_2$$

a valuable polyfluoro epoxy polymer intermediate. The present process may also be used to prepare valuable perfluoroalkylated polymers. Thus, reaction of $C_7F_{15}I$ with $CH_2=CH(CH_2)_7CH_2O_2CCH=CH_2$ gives

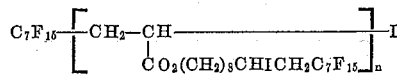
$$C_7F_{15}\left[-CH_2-CH\underset{CO_2(CH_2)_8CHICH_2C_7F_{15}}{\phantom{XXXXXXXXXXXX}}\right]_n I$$

where $n$ is a fairly large number, a water and oil repellent polymer.

The addition of $I(C_rF_{2r})I$ to ethylene gives $$ICH_2CH_2(C_rF_{2r})CH_2CH_2I$$

which is readily converted to the valuable diene $$CH_2=CH(C_rF_{2r})CH=CH_2$$

The present novel process is carried out by heating a mixture of the perfluoroalkyl iodide, olefin or acetylene, and free radical generating catalyst at the required temperature. If the reactants are gaseous or highly volatile at the reaction temperature, the reaction is carried out in a pressure system. Otherwise, the reaction may be carried out at atmospheric pressure in a reflux system. When reaction is complete, the reaction mixture is fractionated into its component parts. Fractional distillation is most often used but other methods may be used if the products are not distillable.

When carried out in a continuous system, the reactants and catalyst are fed at a constant rate into an agitated and heated vessel which is kept liquid full. Product leaving the reaction vessel through a pressure regulating device is fractionated and the product collected. Unreacted starting materials are recycled to the reaction vessel. The pressure used need not be very high, in most cases just sufficient to keep the reactants liquified. If gaseous reactants are involved, the concentration is adjusted with the pressure.

It is apparent to those skilled in the art that substances which interfere with free radical reactions must be avoided in the reaction mixtures. It is particularly important that the perfluoroalkyl iodides used be free of any molecular iodine.

The following representative examples are given to illustrate the practice of the present invention and are not intended to limit the scope of the invention. The examples are at atmospheric pressure unless indicated specifically otherwise.

EXAMPLE 1

A mixture of heptene-1 (19.9 g., 0.2 mole), 1-iodoperfluoropropane (60.0 g., 0.2 mole) and α,α′-azobis-α,γ-dimethylvaleronitrile (0.4 g., 0.0016 mole) was heated under reflux at 55–79° with a nitrogen atmosphere for two hours when refluxing stopped. Heating was continued for a further two hours at 70–76° C. The clear, colorless product was subjected to fractional distillation at 10 mm. pressure giving 64.5 g. (82% conversion) of $$C_3F_7CH_2CHI(CH_2)_4CH_3$$

B.P. 86°, $n_D^{25}$ 1.4072. The distillation residue weighed 3.9 g., $n_D^{25}$ 1.4168. Starting materials (11.9 g., $n_D^{25}$ 1.3595) were collected in a cold trap. Material recovery was 100%.

*Analysis.*—Calcd. for $C_{10}H_{14}F_7I$: C, 30.4; H, 3.56; I, 32.2. Found: C, 30.5; H, 3.8; I, 31.5.

EXAMPLE 2

A mixture of 1,5-hexadiene (8.2 g., 0.1 mole), 1-iodoperfluoropropane (60.0 g., 0.2 mole) and α,α′-azo-bis-α,γ-dimethylvaleronitrile (0.5 g., 0.002 mole) was refluxed for seven hours at 60–65° C. only (96% conversion to product). Fractional distillation of the reaction mixture gave $C_3F_7CH_2CHI(CH_2)_2CH=CH_2$, B.P. 56° C./5.0 mm., $n_D^{25}$ 1.4098 (30% conversion) and $$C_3F_7CH_2CHI(CH_2)_2CHICH_2C_3F_7$$

B.P. 85°/0.5 mm., $n_D^{25}$ 1.4199, M.P. 28° (60% conversion). Unreacted starting materials (13.0 g.) were recovered in the cold trap.

*Analysis* of $C_3F_7CH_2CHI(CH_2)_2CH=CH_2$.—Calcd. for $C_9H_{10}F_7I$: C, 28.6; H, 2.7; F, 35.2. Found: C, 28.7; H, 2.7; F, 32.6.

*Analysis* of $C_3F_7CH_2CHI(CH_2)_2CHICH_2C_3F_7$.—Calcd. for $C_{12}H_{10}F_{14}I_2$: C, 21.4; H, 1.75; F, 39.5. Found: C, 21.9; H, 1.6; F, 38.0.

EXAMPLE 3

Hexyne-1 (9.2 g., 0.1 mole), 1-iodoperfluoropropane (39.1 g., 0.132 mole) and α,α′-azobis-α,γ-dimethylvaleronitrile (0.2 g., 0.8 m. mole) were heated under reflux at 62–70° C. for 6 hours. The reaction product was fractionally distilled giving $C_3F_7CH=CI(CH_2)_3CH_3$, B.P. 76°/20 mm., $n_D^{25}$ 1.4097, 35.8 g. (95% conversion) and 0.5 g. of residue. The cold trap contained 7.1 g. of starting materials.

Redistillation of $C_3F_7CH=CI(CH_2)_3CH_3$ gave B.P. 94° C./50 mm., $n_D^{25}$ 1.4097.

*Analysis.*—Calcd. for $C_9H_{10}F_7I$: C, 28.6; H, 2.67; F, 35.15; I, 33.5. Found: C, 28.8; H, 2.7; F, 35.2; I, 33.0.

The product was shown by analysis of its infrared spectrum to have the trans configuration between the $C_3F_7$ and I groups, bands at 3.22, 3.37, 3.45, 6.08 and 10.30µ.

EXAMPLE 4

A mixture of β-allyloxypropionic acid (0.1 mole), 1-iodoperfluoropropane (0.15 mole) and α,α′-azobisisobutyronitrile (4.0 millimoles) was heated at 50–70° C. for 14 hours giving 86% conversion to product $$C_3F_7CH_2CHICH_2OCH_2CH_2CO_2H$$

(100% recovery, >95% yield), $n_D^{25}$ 1.4263.

*Analysis.*—Calcd. for $C_9H_{10}F_7O_3I$: I, 29.8. Found: I, 27.1.

EXAMPLE 5

$C_3F_7CH_2CHICH_2OCH_2CH_2CO_2H$ (35.0 g., 0.082 mole) was allowed to stand at 25° C. for 2 days with 300 ml. of a solution of potassium hydroxide (15.6 g., 0.28 mole) in alcohol. Acidification of the solution, dilution with 50 ml. of water, extraction with ether and distillation gave $CH_2=CHCH_2OCH_2CH_2CO_2H$, B.P. 66–82°/0.5 mm., $n_D^{25}$ 1.4037, 2.2 g., and $$C_3F_7CH=CH-CH_2OCH_2CH_2CO_2H$$

B.P. 85–87°/0.4 mm., $n_D^{25}$ 1.3752, 17.2 g., (75% conversion).

*Analysis.*—Calcd. for $C_9F_7H_{11}O_3$: C, 36.0; H, 3.7; F, 44.3. Found: C, 37.0; H, 3.2.

Aqueous solutions of the potassium salt of this acid showed high surface activity in water.

$C_3F_7CH=CHCH_2O(CH_2)_2CO_2H$ was reduced in 95% ethanol solution with platinum oxide catalyst and hydrogen at 43.8 p.s.i.g. in 16 hours to $$C_3F_7(CH_2)_3O(CH_2)_2CO_2H$$

B.P. 138°/10 mm., $n_D^{25}$ 1.3634.

*Analysis.*—Calcd. for $C_9H_{11}F_7O_3$: C, 36.0; H, 3.7. Found: C, 36.2; H, 3.3.

In the same manner as Example IV, n-perfluoroheptyl iodide (50 g.), β-allyloxypropionic acid (43 g.) and azobis-isobutyronitrile (0.4 g.) were heated at 90–100° C. for five hours, giving $C_7F_{15}CH_2CHICH_2O(CH_2)_2CO_2H$ in 70% conversion, $n_D^{25}$ 1.3969.

*Analysis.*—Calcd. for $C_{13}H_{10}F_{15}O_3I$: C, 24.9; H, 1.61; F, 45.6; I, 20.3. Found: C, 26.4; H, 1.85; F, 42.3; I, 19.4.

The above product (43 g.) was treated with potassium hydroxide (10 g.) in 90% ethanol (200 ml.) at 30–40° for two hours then at room temperature overnight. The solution was then neutralized (litmus) and the solvent evaporated at 300 mm. pressure. Then, 10 ml. of 10% sulfuric acid in 100 ml. of water was added. The mixture was extracted with ether three times. After washing the ether solution with water three times and shaking with mercury to remove iodine, it was dried over magnesium sulfate and distilled, giving 1.9 g. of forerun and 19.1 g. of $C_7F_{15}CH=CHCH_2O(CH_2)_2CO_2H$, B.P. 121°/0.5 mm. The redistilled product had B.P. 150°/3.5 mm., $n_D^{25}$ 1.3551.

*Analysis.*—Calcd. for $C_{13}H_9F_{15}O_3$: C, 31.4; H, 1.8; F, 57.2. Found: C, 31.4; H, 1.8; F, 56.9.

In the same manner as above $$C_7F_{15}CH=CHCH_2O(CH_2)_2CO_2H$$

was reduced to $C_7F_{15}(CH_2)_3O(CH_2)_2CO_2H$, B.P. 113° C./0.2 mm., $n_D^{25}$ 1.3491.

*Analysis.*—Calcd. for $C_{13}H_{11}F_{15}O_3$: C, 31.2; H, 2.2; F, 57.0. Found: C, 31.4; H, 2.2; F, 58.0.

Both $C_3F_7CH_2CHICH_2O(CH_2)_2CO_2H$ and $$C_7F_{15}CH_2CHIO(CH_2)_2CO_2H$$

are surface active agents. However, since the iodine is somewhat labile, it is better to convert them to the olefinic or saturated acids for use as surfactants.

Surface tensions of aqueous solutions of $$C_3F_7(CH_2)_3O(CH_2)_2CO_2H$$

as the sodium salt, are as follows:

| Conc. (wt. percent) | 0.75 | 0.38 | 0.19 | 0.10 | 0.05 |
|---|---|---|---|---|---|
| γ25 dynes/cm H₂O corrected | 22.6 | 25.8 | 25.1 | 26.3 | 36.5 |

Surface tensions of aqueous solutions of $$C_7F_{15}CH=CHCH_2O(CH_2)_2CO_2H$$

as the sodium salt, are as follows:

| Conc. (wt. percent) | 0.4 | 0.2 | 0.1 | 40.05 | 0.025 |
|---|---|---|---|---|---|
| γ25 dynes/cm H₂O corrected | 15.7 | 15.8 | 15.9 | 16.6 | 17.5 |

| Conc. (wt. percent) | 0.0125 | 0.00625 | 0.0034 | 0.0016 | 0.00078 |
|---|---|---|---|---|---|
| γ25 dynes/cm H₂O corrected | 20.5 | 21.9 | 25.0 | 28.9 | 34.9 |

Surface tensions of aqueous solutions of $$C_7F_{15}(CH_2)_3O(CH_2)_2CO_2H$$

as the sodium salt, are as follows:

| Conc. (wt. percent) | 0.8 | 0.4 | 0.2 | 0.1 | 0.05 | 0.025 |
|---|---|---|---|---|---|---|
| γ25 dynes cm H₂O corrected | 15.4 | 15.0 | 14.9 | 15.1 | 15.1 | 16.8 |

| Conc. (wt. percent) | 0.0125 | 0.0067 | 0.0033 | 0.0016 | 0.0008 |
|---|---|---|---|---|---|
| γ25 dynes/cm H₂O corrected | 20.9 | 22.3 | 26.3 | 34.7 | 41.8 |

The aqueous solutions of the above acids have been found to be particularly useful for extinguishing hydrocarbon fires.

EXAMPLE 6

Commercial vinyl acetate (containing 20 p.p.m. hydroquinone) was treated at 10° C. for 10 min. with 1% by weight potassium hydroxide pellets, decanted and carefully distilled, B.P. 73°, $n_D^{25}$ 1.3923. The distilled material was kept cold, under nitrogen, until used.

A mixture of vinyl acetate (8.6 g., 0.10 mole), 1-iodoperfluoropropane (29.6 g., 0.1 mole) and α,α'-azobis-α,γ-dimethylvaleronitrile (0.10 g.) was heated at reflux under a nitrogen atmosphere for two hours. Then a solution of 0.1 g. of the azonitrile and 10 g. of iodide was added and the heating was continued for 3.5 hours at 75–78°. Excess iodide and vinyl acetate were then removed from the product at 20 mm. pressure (13.6 g., $n_D^{25}$ 1.3298). The residue weighed 33.1 g. (87% conversion, 96% material recovery). The product $C_3F_7CH_2CHIO_2CCH_3$ had a boiling point of 46°/1.5 mm. or 56°/5 mm., $n_D^{25}$ 1.3971. The product darkens on exposure to air and light.

*Analysis.*—Calcd. for $C_7F_7H_6O_2I$: C, 22.0; H, 1.58; F, 34.8; I, 33.2. Found: C, 22.4, 22.1; H, 1.5, 1.5; F, 34.4, 34.3; I, 32.9.

EXAMPLE 7

A solution of $C_3F_7CH_2CHIO_2CCH_3$ (81.0 g., 0.21 mole) in cold alcohol (100 ml.) was added over a period of one hour to a rapidly stirred slurry of zinc dust (20 g.) in alcohol (50 ml.) heated at 60–80° C. The solution was saturated with dry hydrogen chloride at 15 min. intervals. An additional 10 g. of zinc dust was added after three-quarters of an hour and refluxing was continued for one-half hour after the addition was complete. The product was extracted with water, the water solution made alkaline and extracted with ether. The ether solution, after drying over anhydrous magnesium and calcium sulfates, was distilled giving $C_3F_7CH_2CH_2OH$, B.P. 125° or 75°/100 mm., $n_D^{25}$ 1.3123, 28.7 g. (67% conversion), and $C_3F_7CH_2CH_2O_2CCH_3$, B.P. 38–49°/10 mm., $n_D^{25}$ 1.3282, 3.3 g. (6.2% conversion). Park et al., J. Org. Chem., 23, 1166 (1958), have reported similar boiling points for these compounds.

When the reduction was carried out by standard techniques using lithium aluminum hydride, a 72% yield of alcohol was obtained.

If the reduction is carried out using zinc in moist ether, the coupled product

results.

EXAMPLE 8

(A) A mixture of β-pinene (27.2 g., 0.20 mole), 1-iodoperfluoropropane (29.6 g., 0.10 mole) and α,α'-azobis-α,γ-dimethylvaleronitrile (0.5 g.) was heated at 50–60° C. for six hours (some exothermic reaction) giving a colorless reaction product. Unreacted materials were pumped off at 70°/1 mm., giving 31.8 g. (74% conversion) of a light yellow liquid which solidified on cooling. Recrystallization of the solid from methylene chloride gave material, M.P. 35–36.5° C. which was sensitive to light and air.

*Analysis.*—Calcd. for $C_{13}H_{16}F_7I$: C, 36.2; H, 3.7; F, 30.8; I, 29.4. Found: C, 36.1; H, 3.9; F, 30.2; I, 28.3.

The cold trap contained 17% of the $C_3F_7I$ and 66% of the β-pinene charged.

The product from this reaction was not

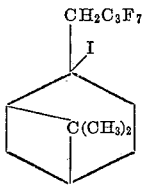

Spectroscopic evidence indicates that a ring opening reaction occurred here since a carbon-carbon double bond was present.

(B) When a similar reaction was carried out at 75° C. for 5 hours, an attempt was made to distil the product. At 20 mm. pressure, decomposition set in. When the pressure was reduced to 0.5 mm., a series of compounds distilled. These were shown to be

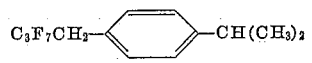

and

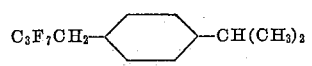

and bornyliodide, resulting from loss of iodine and disproportionation of the initial addition product. The bornyl iodide results from reaction of β-pinene with hydrogen iodide. The products are characterized in the experiment below.

(C) A mixture of β-pinene (40.8 g., 0.30 mole), 1-iodoperfluoropropane (100 g., 0.33 mole) and benzoyl peroxide (1.0 g.) was charged into a Hastelloy C tube, sealed and heated at 100° C. for 8 hours. The product (134 g.) was distilled giving $C_3F_7I$ (75% recovery), β-pinene (50% recovery), a mixture of

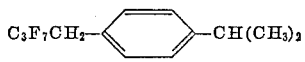

and

(17%) and bornyliodide (17.9 g., B.P. 53°/0.5 mm., $n_D^{25}$ 1.5401.

*Analysis.*—Calcd. for $C_{10}H_{17}I$: I, 48.2. Found: I, 46.3.

The mixture of benzene and cyclohexane derivatives was treated for ½ hour with 5% sodium carbonate, then for 2 hours with a saturated sodium bisulfite solution. After extraction into ether and drying, the material distilled at 130–131°/80 mm., $n_D^{25}$ 1.4011 to 1.4033.

*Analysis.*—Calcd. for $C_{13}H_{13}F_7$: C, 51.6; H, 4.34. Found: C, 51.6; H, 4.4.

Vapor phase chromatography showed the mixture to be 36%

and 62%

the pure materials were collected from the chromatogram.

*Analysis of benzene derivative.*—Calcd. for $C_{13}H_{13}F_7$: C, 51.6; H, 4.34. Found: C, 52.0; H, 4.4.

*Analysis of cyclohexane derivative.*—Calcd. for $C_{13}H_{19}F_7$: C, 50.6; H, 6.2. Found: C, 51.7; H, 5.2.

EXAMPLE 9

A mixture of norbornylene (bicyclo(2,2,1)heptene-2) (9.4 g., 0.10 mole), 1-iodoperfluoropropane (29.6 g., 0.10 mole) and α,α'-azobis-α,γ-dimethylvaleronitrile (10.3 g., 1.2 mm.), was heated under nitrogen at 60–80° C. for five hours. The product 2-heptafluoropropyl-3-iodobicyclo(2,2,1)heptane (40.5 g., 100% recovery) was distilled giving a liquid (35.2 g., B.P. 105°/20 mm., $n_D^{25}$ 1.4401–1.4406, conversion 90%, yield 100%). The cold trap contained 4.3 g. starting materials.

*Analysis.*—Calcd. for $C_{10}H_{10}F_7I$: C, 30.8; H, 2.58; F, 34.1; I, 32.6. Found: C, 30.8; H, 2.3; F, 36.7; I, 31.8.

The product appears to have the trans geometric configuration since HI cannot be removed readily by refluxing with alcoholic alkali nor by distillation from concentrated aqueous alkali.

EXAMPLE 10

A mixture of 16-heptadecenoic acid (13.5 g., 0.05 mole) 1-iodoperfluoroheptane (25 g., 0.05 mole) and α,α'-azobisisobutyronitrile (0.1 g., 1.2 mm.) was heated at 80–100° C. for seven hours. The excess $C_7F_{15}I$ was then removed giving 37.7 g. (98%) of crude $$C_7F_{15}CH_2CHI(CH_2)_{14}CO_2H$$

M.P. 47.5–49° C.

*Analysis.*—Calcd. for $C_{24}H_{32}F_{15}O_2I$: F, 37.3; I, 16.6. Found: F, 35.0; I, 15.9.

The above crude acid was treated with zinc in alcoholic hydrogen chloride (cf. Example 7) giving $$C_7F_{15}(CH_2)_{16}CO_2C_2H_5$$

M.P. 53.5–58° in 100% recovery. Recrystallization from 95% alcohol raised the M.P. to 59–59.5° C.

*Analysis.*—Calcd. for $C_{26}H_{37}F_{15}O_2$: C, 46.9; H, 5.60. Found: C, 46.9; H, 5.3.

The ester was hydrolyzed with alcoholic potassium hydroxide which gave, on acidification, the free acid $$C_7F_{15}(CH_2)_{16}CO_2H$$

M.P. 91.5–92.0° from chloroform.

*Analysis.*—Calcd. for $C_{24}H_{33}F_{15}O_2$: C, 45.2; H, 5.21; F, 44.6. Found: C, 45.2; H, 5.5; F, 43.4.

Alcoholic solutions of the potassium salt of this acid did not wet glass but rolled off like oil.

EXAMPLE 11

(A) A mixture of 1-iodoperfluoropropane (0.33 mole), tri-chlorotrifluoroethane (72 g.) and di-tert-butyl peroxide (6.5 mmoles) was charged into 400 ml. Hastelloy C shaker tube. Ethylene (0.4 mole) was compressed into the sealed shaker tube and the total mixture was heated at 138–188° C. for eight hours. Distillation of the reaction mixture gave $C_3F_7CH_2CH_2I$ in 87% conversion and 92% yield, B.P. 80°/200 mm., $n_D^{25}$ 1.3767.

This compares well with B.P. 77.8°/185 mm., $n_D^{25}$ 1.3771 reported by Park et al. (J. Org. Chem., 23, 1166 (1958)).

No telomer products containing more than one ethylene unit were obtained.

(B) A mixture of 1-iodorperfluoropropane (0.1 mole) and α,α'-azobisisobutyronitrile (0.5 g.) was charged into a shaker tube as previously described. Ethylene was then pressured into the tube. The contents were then heated at 80° C. for 8 hours. The product was then distilled. The experimental variables and composition of the products are shown below.

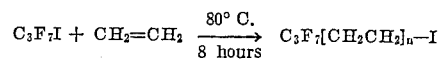

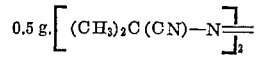

| Ethylene Pressure | Wt. percent of products $C_3F_7[CH_2CH_2]_n$—I | | | | | | |
|---|---|---|---|---|---|---|---|
| | n=0 | 1 | 2 | 3 | 4 | 5 | 6 | >6 |
| Initial: | | | | | | | | |
| 375 p.s.i. | <2 | 36 | 56 | 5 | | | | |
| 700 p.s.i. | 1 | 20 | 67 | 8 | | | | |
| 4000 p.s.i. | <2 | 6 | 32 | 16 | 13 | 16 | 21 | |

| $C_3F_7(CH_2CH_2)_nI$ | Physical Properties | |
|---|---|---|
| | B.P., ° C. | $n_D^{25}$ |
| n= | | |
| 1 | 80/200 mm. | |
| 1 | 62/100 mm. | 1.3767 |
| 2 | 115/100 mm. | 1.3984 |
| 3 | 111/20 mm. | 1.4078 |
| 4 | 138/20 mm. | 1.4150 |
| 5 | 147/10 mm. | 1.4241 |

From a similar series of reactions using $C_5F_{11}I$ and $C_7F_{15}I$, the following compounds were characterized.

| $C_7F_{15}(CH_2CH_2)_nI$ | B.P./mm., °C | M.P., °C | $C_5F_{11}(CH_2CH_2)_nI$ | B.P./mm., °C |
|---|---|---|---|---|
| n= | | | | |
| 1 | 73°/8 | 42–44 | n=1 | 95–96/100 |
| 2 | 108°/8 | 38–45 | | |
| 3 | 136°/8 | 36–39 | | |
| 4 | 108°/0.6 | | | |
| 5 | 119°/0.6 | | | |

| $C_3F_7(CH_2CH_2)_nI$ | Analyses calc'd. | | | | Found | | | |
|---|---|---|---|---|---|---|---|---|
| | C | H | F | I | C | H | F | I |
| n= | | | | See Example XIa | | | | |
| 1 | | | | | | | | |
| 2 | 23.8 | 2.3 | | | 36.0 | 24.2 | 2.4 | 35.8 |
| 3 | 28.4 | 3.2 | | | 33.4 | 28.5 | 3.2 | 32.8 |
| 4 | 32.4 | 4.0 | | | 31.3 | 33.3 | 4.3 | 30.3 |
| 5 | 35.8 | 4.6 | | | 29.1 | 36.8 | 5.1 | 29.0 |
| $C_7F_{15}(CH_2CH_2)_nI$ | Reported by Park et al., WADC Tr 56-590, pt. II | | | | | | | |
| 1 | 23.9 | 1.5 | 51.6 | 23.0 | 24.2 | 1.5 | 51.5 | 22.9 |
| 2 | 26.9 | 2.1 | 49.2 | 21.9 | 27.2 | 2.2 | 48.6 | 22.0 |
| 3 | 29.6 | 2.7 | 46.8 | 20.9 | 30.1 | 2.7 | 46.9 | 20.7 |
| 4 | 32.1 | 3.2 | 44.8 | 20.0 | 32.5 | 3.3 | 44.6 | 20.4 |

Thus, it can be seen that products containing varying amounts of ethylene can be prepared by proper adjustment of reaction conditions.

EXAMPLE 12

A mixture of uninhibited vinyl acetate (prepared as described in Example 6 (8.4 g., 0.1 mole), 1,6-diiodoperfluorohexane (20.0 g., 0.036 mole) and $\alpha,\alpha'$-azobisisobutyronitrile (0.1 g.) was heated at 87–130° for 3 hours. Conversion of iodide was essentially complete (26.6 g. product). The product,

$CH_3CO_2CHICH_2(CF_2CF_2)_3CH_2CHIO_2CCH_3$ was a solid which was not stable to distillation.

*Analysis.*—Calcd. for $C_{14}H_{12}F_{12}O_4I_2$: C, 23.1; H, 1.66; F, 31.3; I, 34.9. Found: C, 24.5; H, 2.4; F, 30.2; I, 33.5.

A mixture of the above product (24 g.), zinc (20 g.) and acetic acid (75%, 100 ml.) was heated at 50–65° C. for 1 hour while anhydrous hydrogen chloride was added periodically. The reaction mixture was drowned in water, neutralized and extracted with ether. After drying the ether solution was distilled giving a liquid, B.P. 123–125°/0.8 mm., 7.2 g. The infrared spectrum indicated the product to be a mixture of acetate and alcohol. Heating with acetic anhydride gave after distillation 7.2 g. of pure diacetate (no OH band in IR), B.P. 104°/0.1 mm., $n_D^{25}$ 1.3698.

*Analysis.*—Calcd. for $C_{14}H_{14}F_{12}O_4$: C, 35.4; H, 3.0; F, 48.10. Found: C, 35.4; H, 3.0; F, 47.8.

EXAMPLE 13

A mixture of 1-iodoperfluoroundecane (11.0 g., 0.016 mole), uninhibited vinyl acetate (see Example 6, 3.0 g., 0.035 mole) and $\alpha,\alpha'$-azobisisobutyronitrile (0.1 g.) was heated at 74–80° C. for 7 hours. The product (13.3 g., 100% recovery) was an impure solid, M.P. 75–83° C. Recrystallization of a small amount from methylene chloride gave a precipitated gel of $C_{11}F_{23}CH_2CHIO_2CCH_3$, M.P. 88–107°.

*Analysis.*—Calcd. for $C_{15}H_6F_{23}O_2I$: C, 23.0; H; 0.8. Found: C, 23.7; H, 1.1.

A mixture of $C_{11}F_{23}CH_2CHIO_2CCH_3$ (10 g., 0.013 mole), zinc (10 g.) and 75% aqueous acetic acid (50 cc.) were heated together for 1 hour. Recovery of the product as previously described gave $C_{11}F_{23}CH_2CH_2OH$, (5.0 g.), M.P. 108–110°; and an ether and chloroform insoluble solid (1.5 g.) melting range 94–117°.

*Analysis.*—Calcd. for $C_{13}H_5F_{23}O$: C, 25.4; H, 0.8; F, 71.1. Found: C, 25.8; H, 1.4; F, 70.4.

EXAMPLE 14

A mixture of 1-iodo-4-hydroperfluorobutane (20.8 g., 0.1 mole), uninhibited vinyl acetate (see Example 6, 6.0 g., 0.12 mole) $\alpha,\alpha'$-azobis-$\alpha,\gamma$-dimethylvaleronitrile (0.8 mmole) and $\alpha,\alpha'$ - azobisisobutyronitrile (0.6 mmole), was heated at 70–92° C. for 12 hours. The crude product weighed 25.2 g. (100% recovery). The conversion was 88% and the yield of $H(CF_2)_4CH_2CHIO_2CCH_3$ was greater than 90%.

*Analysis.*—Calcd. for $C_8H_7F_4O_2I$: C, 23.2; H, 1.7; F, 36.7; I, 31.4. Found: C, 25.5; H, 2.7; F, 33.0; I, 29.3.

The crude product could not be distilled, but it was reduced by heating 24 g. (0.052 mole) with zinc (10 g.), 100 ml. of ethanol and 10 ml. of concentrated hydrochloric acid at 56–60° C. The reaction mixture was drowned in water and extracted with chloroform. Distillation of the dry chloroform solution gave

$H(CF_2)_4CH_2CH_2OH$

B.P. 71°/15 mm., $n_D^{25}$ 1.3322, 6.7 g., 51% yield.

*Analysis.*—Calcd. for $C_6H_6F_8O$: C, 29.3; H, 2.5; F, 62.1. Found: C, 29.7; H, 2.7; F, 61.9.

A second unknown fraction, B.P. 90–102°/0.6 mm., $n_D^{25}$ 1.3678. Found: C, 32.8; H, 2.8; F, 56.4; 3.3 g. (25%) was also obtained.

EXAMPLE 15

A mixture of 1-iodoperfluoroheptane (0.1 mole), uninhibited vinyl acetate (0.1 mole) and $\alpha,\alpha'$-azobisisobutyronitrile (0.1 g.) was heated under nitrogen at 70–80° C. for 5 hours. Then 4.0 g. of perfluoroheptyl iodide and 0.1 g. of azonitrile were added and heating was continued for two hours (the reaction is somewhat exothermic). Excess $C_7F_{15}I$ was pumped off at 60°/8 mm. leaving 57.4 g. of liquid residue (95%

$C_7F_{15}CH_2CHIO_2CCH_3$)

*Analysis.*—Calcd. for $C_{11}H_6F_{15}O_2I$: C, 22.7; H, 1.0; F, 48.9; I, 21.8. Found: C, 24.2; H, 1.5; F, 49.1; I, 20.9.

The crude iodoacetate (55 g., 0.095 mole) was dissolved in 100 ml. of 95% ethanol and this solution was added over a one hour period to a slurry of zinc dust (20 g., 0.30 mole) in 95% ethanol (150 ml.) and 10 ml. of concentrated hydrochloric acid at 60° C. while stirring rapidly. Two, 5 ml. portions of hydrochloric acid were added during the period of addition. After addition, the mixture was stirred for one hour, cooled to 25° C. and diluted with water (100 ml.). The oil layer was collected (36.6 g.) and the aqueous layer was extracted with chloroform. Distillation of the combined solutions gave 39.7 g. (95%) of crude product which was then heated at 60° C. for one hour with 50 ml. of 10% ethanolic potassium hydroxide. The mixture was drowned in water, and extracted into chloroform, which, after drying over magnesium sulfate, was distilled giving

$C_7F_{15}CH_2CH_2OH$

B.P. 84°/10 mm., $n_D^{25}$ 1.3164.

*Analysis.*—Calcd. for $C_9H_5F_{15}O$: C, 26.2; H, 1.2. Found: C, 26.4; H, 1.6.

An infrared band was present at 2.95$\mu$ due to hydroxyl group.

EXAMPLES 16 TO 68

These examples were carried out in manners analogous to the examples already described. The details are indicated in Tables I and II which follow.

*Table I*

REACTIONS

| Ex. | Method | Olefin | R$_f$I | Moles olefin | R$_f$I | Initiator (a) | Initiator Mrmoles | Temp., °C. | Time, hr. | Product structure | Percent conv. | Percent yield |
|---|---|---|---|---|---|---|---|---|---|---|---|---|
| 16 | Reflux | 3-Heptene | (CF$_3$)$_2$CFI | 0.1 | 0.1 | {AVN, ABN} | 1.0, 1.2 | 66–70 | 13 | (CF$_3$)$_2$CFCH–CHI–n-C$_3$H$_7$ <br> \|  <br> C$_2$H$_5$ | ~20 | ~20 |
| 17 | ...do... | Allylbenzene | n-C$_3$F$_7$I | 0.1 | 0.1 | ABN | 2.4 | 60–80 | 20 | n-C$_3$F$_7$CH$_2$CHICH$_2$C$_6$H$_5$ | 72.5 | 95 |
| 18 | ...do... | Cyclohexene | n-C$_3$F$_7$I | 0.1 | 0.1 | ABN | 1.6 | 53 | 3 | cyclohexane-C$_3$F$_7$, I | 5 | -- |
| 19 | ...do... | Cyclohexene | n-C$_3$F$_7$I | 0.2 | 0.2 | AVN | 2.4 | 53 | 20 | cyclohexane-C$_3$F$_7$, I | 5 | -- |
| 20 | Press. tube | Cyclohexene | n-C$_3$F$_7$I | 0.1 | 0.1 | ABC | 1.0 | 97 | 5 | cyclohexane-C$_3$F$_7$, I | 10 | >95 |
| 21 | ...do... | Cyclohexene | n-C$_3$F$_7$I | 0.1 | 0.1 | DTBP | 3.0 | 140 | 10 | cyclohexane-C$_3$F$_7$, I | 10 | >95 |
| 22 | Reflux | Bicyclo(2,2,1)heptadiene-2,5 | n-C$_3$F$_7$I | 0.2 | 0.1 | AVN | 1.2 | 50–60 | 5 | norbornene-C$_3$F$_7$/I adduct — 2 isomers | 95 | >95 |
| 23 | ...do... | Same as 22 | n-C$_3$F$_7$I | 0.3 | 0.2 | ABN | 1.8 | 60–80 | 7 | Same as 22 | 85 | 99 |
| 24 | ...do... | ...do... | n-C$_3$F$_7$I | 0.2 | 0.1, 100 ml. C$_2$H$_5$O$_2$CCH$_3$ | ABN | 3.0 | 70–80 | 6 | ...do... | 95 | 99 |
| 25 | ...do... | ...do... | n-C$_3$F$_7$I | 0.1 | 0.1 | ABN | 1.5 | 70–80 | 8 | ...do... | 90 | >95 |
| 26 | Press. tube | Isobutene | n-C$_3$F$_7$I | 0.1 | 0.1 | ABN | 1.2 | 72–80 | 17 | (CH$_3$)$_2$CICH$_2$n-C$_3$F$_7$ | 44 | 90 |
| 27 | ...do... | Methylenecyclopropane | n-C$_3$F$_7$I | 0.1 | 0.1 | ABN | 1.2 | 50–80 | 6 | CH$_2$–CICH$_2$n-C$_3$F$_7$ cyclopropane | 96 | 96 |
| 28 | Reflux | CH$_2$=C(CH$_2$–CH$_2$)CH–CN (methylenecyclopropane-CN) | n-C$_3$F$_7$I | 0.1 | 0.1 | AVN | 1.6 | 60–70 | 12 | n-C$_3$F$_7$CH$_2$–CI–(CH$_3$)(CH$_3$)–CHCN | 50 | >95 |

See footnotes at end of table.

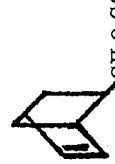

*Table I—Continued*
REACTIONS—Continued

| Ex. | Method | Olefin | $R_fI$ | Moles olefin | $R_fI$ | Initiator (a) | Initiator Mmoles | Temp., °C. | Time, hr. | Product structure | Percent conv. | Percent yield |
|---|---|---|---|---|---|---|---|---|---|---|---|---|
| 54 | Reflux | Styrene | n-$C_3F_7$I | 0.13 | 0.13 | ABN | 1.2 | 60 | 5 | n-$C_3F_7$[$CH_2CH$]$_n$—I, $C_6H_5$ | n=2 | 2.2 g. |
| 55 | ...do... | $CH_2$=CH—$\overset{O}{C}$—NH—$CH_2$—NH—C=O, $CH_2$=CH($CH_2$)$_8$ | n-$C_3F_7$I | 0.1 | 0.1 | ABN | 1.8 | 67–75 | 8 | n-$C_3F_7$—$CH_2$—CH—$\overset{CONHCH_2NH}{\underset{C=O}{\|}}$—$CH_2CHI(CH_2)_8$ | 75 | 75 |
| 56 | ...do... | $CH_2$=CH($CH_2$)$_8CO_2C_2H_5$ | ($CF_3$)$_2$CF(CF$_2$)$_3$I | 0.05 | 0.05 | ABN | 1.2 | 70–75 | 11 | ($CF_3$)$_2$CF($CF_2$)$_3CH_2CHI(CH_2)_{10}CO_2C_2H_5$ | 87 | >95 |
|  |  |  |  |  | Reduced to Hydrolyzed to |  |  |  |  | ($CF_3$)$_2$CF($CF_2$)$_3$($CH_2$)$_2$($CH_2$)$_{10}CO_2H$ |  | 71 |
| 57 | ...do... | Same as 56 | ($CF_3$)$_2$CF(CF$_2$)I | 0.042 | 0.042 | ABN | 1.2 | 75–84 | 10 | ($CF_3$)$_2$CF($CF_2$)$_4CH_2CHI(CH_2)_{10}CO_2C_2H_5$* | >95 | 80 |
|  |  |  |  |  | Reduced to |  |  |  |  | ($CF_3$)$_2$CF($CF_2$)$_4$($CH_2$)$_2$($CH_2$)$_{10}CO_2H$ |  | >95 |
| 58 | ...do... | Same as 56 | ($CF_3$)$_2$CF(CF$_2$)$_5$I | 0.035 | 0.035 | ABN | 1.2 | 71–85 | 10 | ($CF_3$)$_2$CF($CF_2$)$_5CH_2CHI(CH_2)_{10}CO_2C_2H_5$* | >95 | 75 |
|  |  |  |  |  | Reduced to Hydrolyzed to |  |  |  |  | ($CF_3$)$_2$CF($CF_2$)$_5$($CH_2$)$_2$($CH_2$)$_{10}CO_2H$ |  | 90, >95, 85 |
| 59 | ...do... | ...do... | $CF_3$(CF$_2$)$_2$CFI, $\overset{\|}{CF_3}$ | 0.05 | 0.05 | ABN | 0.6 | 80–130 | 5 | $CF_3$(CF$_2$)$_2$CFCH$_2$CHI($CH_2$)$_8CO_2C_2H_5$, $\overset{\|}{CF_3}$ | 100 | 88, 100 |
|  |  |  |  |  | Reduced to |  |  |  |  | $CF_3$(CF$_2$)$_2$CF(CH$_2$)$_{10}CO_2C_2H_5$, $\overset{\|}{CF_3}$ | 90 | 62 |
|  |  |  |  |  | Hydrolyzed to |  |  |  |  | $CF_3$(CF$_2$)$_2$CF(CH$_2$)$_{10}CO_2H$, $\overset{\|}{CF_3}$ | 90 | 90 |
| 60 | ...do... | Vinyl acetate | Cl($CF_2$)$_2$I | 0.1 | 0.1 | ABN | 1.8 | 66–77 | 7 | Cl($CF_2$)$_2$CH$_2$CHIO$_2$CCH$_3$ | 83 | >95 |
| 61 | ...do... | ...do... | Br($CF_2$)$_2$I | 0.05 | 0.05 | ABN | 0.6, 3.1 | 70–83 | 6 | Br($CF_2$)$_2$CH$_2$CHIO$_2$CCH$_3$ | 50 | >90 |
| 62 | ...do... | $CH_2$=CHCH$_2$CN | n-$C_3F_7$I | 0.1 | 0.2 | {ABN, AVN} | 1.0 | 52–64, 20 ml. ethyl acetate | 12 | n-$C_3F_7CH_2CHICH_2CN$ | 10 | >90 |
|  |  | Acetylenes |  |  |  |  |  |  |  |  |  |  |
| 63 | ...do... | $C_6H_5C$≡CH | n-$C_3F_7$I | 0.1 | 0.1 | ABN | 2.4 | 60–78 | 8 | $C_3F_7$[$CH$=C]$_n$—I, n=1, n=2, $C_6H_5$ | 40 | 66, 33 |
| 64 | ...do... | HC≡C(CH$_2$)$_8CO_2H$ | n-$C_3F_7$I | 0.044 | 0.08 | AVN | 0.4 | 45–50 | 9.0 | n-$C_3F_7$CH=CI(CH$_2$)$_8CO_2H$ | 89 | 100 |
| 65 | ...do... | 3-Hexyne | n-$C_3F_7$I | 0.1 | 0.1 | AVN | 0.8 | 56–58 | 6 | n-$C_3F_7$—C=Cl—$C_2H_5$, $\overset{\|}{C_2H_5}$ | 5.3 | 95 |
| 66 | ...do... | H C≡O—CO$_2$CH$_3$ H | n-$C_7F_{15}$I | 0.12 | 0.17 | AVN | 1 | 50 | 6 | n-$C_7F_{15}$CH=ClCO$_2$CH$_3$ | 11 | 95 |
| 67 | ...do... | H C≡C—CO$_2$CH$_3$ H | n-$C_7F_{15}$I | 0.30 | 0.21 | ABN | 4.9 | 85–90 | 16 | n-$C_7F_{15}$CH=ClCO$_2$CH$_3$ | 47 | 94 |
| 68 | ...do... | C≡C—CO$_2$H | n-$C_7F_{15}$I | 0.1 | 0.11 | AVN | 1.2 | 80–90 | 5 | n-$C_7F_{15}$CH=ClCO$_2$H | 11 | 95 |

(a) AVN=α,α′-Azobis-α,γ-dimethylvaleronitrile. ABN=α,α′-Azobisisobutyronitrile. ABC=α,α′-Azobiscyclohexanecarbonitrile. DTPB=Di-tert-butyl peroxide.
* $C_2H_5$.

Table II
PRODUCTS

| Example No. | Product | b.p./mm. | $n_D^{25}$ | Calculated C | Calculated H | Calculated F | Calculated I | Found C | Found H | Found F | Found I |
|---|---|---|---|---|---|---|---|---|---|---|---|
| 17 | $CF_3(CF_2)_2CH_2CHICH_2C_6H_5$ | 68/0.7 | 1.4672 | 34.8 | 2.4 | 32.1 | | 35.1 | 2.4 | 31.2 | |
| 18–21 | (cyclohexyl)-$C_3F_7$, -I | 40/0.4 | 1.4340 | 28.6 | 2.9 | 35.2 | 33.6 | 29.6 | 2.9 | 35.1 | 32.3 |
| 22–25 | (norbornyl) I—, —$C_3H_7$ | 79/5.0 | 1.447 | 31.0 | 2.1 | 34.3 | 32.8 | 31.0 | 2.2 | 33.8 | 31.3 |
| 26 | $(CH_3)_2CICH_2$—$C_3F_7$ | 46/20 | 1.3963 | 23.9 | 2.3 | 37.8 | 36.1 | 23.7 | 2.5 | 38.2 | 35.7 |
| 27 | $CH_2$\ I\ C—$CH_2$—$C_3F_7$ / $CH_2$ | 52/17 | 1.4010 | 24.0 | 1.7 | 38.0 | 36.3 | 24.2 | 1.9 | 37.5 | 36.0 |
| 28 | $C_3F_7CH_2CI$ (cyclic $CH_2$/$CH_2$/CH—CN) | ¹67–70 | | 27.8 | 1.8 | 34.2 | | 28.9 | 1.6 | 33.3 | |
| 29 | $C_3F_7$-(norbornyl)-I, $CH_2O_2CCH_3$ | 100–110/1.0 | 1.4493–1.4541 | 33.8 | 3.0 | 28.75 | 27.5 | 33.6 | 2.9 | | |
| 30–32 | $C_3F_7CH_2CHICH_2O_2CCH_3$ | 78/5.0 | 1.4051 | 24.2 | 2.0 | 33.6 | 32.0 | 24.8 | 2.0 | 34.0 | 31.2 |
| | $C_3F_7$—[$CH_2CH$—$CH_2O_2CCH_3$]$_2$—I | Oil | 1.4409 | 34.3 | 4.4 | 25.4 | 24.9 | 39.2 | 4.2 | 25.7 | 21.3 |
| 33 | $C_3F_7CH_2CHI(CH_2)_9O_2CCH_3$ | 122/0.25 | 1.4303 | 37.9 | 4.4 | 26.3 | 25.1 | 38.0 | 4.4 | | 25.0 |
| 34 | $n$-$C_3F_7CH_2CHICH_2CO_2C_2H_5$ | 51/0.35 | 1.4077 | 26.4 | 2.5 | 32.4 | 31.0 | 27.4 | 2.7 | 31.3 | 29.3 |
| 35 | $C_3F_7CH_2CHICH_2CO_2H$ | 39–85/0.6 | Solid | | | | | | | | |
| 36 | $n$-$C_3F_7$—$CH_2$—$CHICH_2CH(CO_2C_2H_5)_2$ | 108/0.9 | 1.4202 | 31.5 | 3.25 | 26.8 | 25.6 | 31.6 | 3.1 | 26.5 | 24.0 |
| 37–38 | $n$-$C_3F_7CH_2CHI(CH_2)_8CO_2C_2H_5$ | 125/0.21 | 1.4300 | 37.8 | 4.8 | 26.2 | 25.0 | 38.4 | 5.0 | 25.1 | 24.7 |
| 39 | $n$-$C_3F_7CH_2CHI(CH_2)_8$—C(=O)—CH—$(CH_2)_4$—C=O | Oil | 1.4701 | | | | | | | | |
| 40–44 | $n$-$C_3F_7CH_2CHIO_2CCH_3$ | 71/25 | 1.3999 | analyses, see Example 6 | | | | | | | |
| 45 | $n$-$C_7F_{15}CH_2CHI(CH_2)_3CO_2C_2H_5$ | 136/0.2 | 1.4032 | 33.9 | 3.4 | 40.3 | 17.9 | 34.9 | 3.4 | 40.5 | 16.2 |
| 46 | $[n$-$C_7F_{15}CH_2CHI(CH_2)_3CONH]_2CH_2$ | ¹126–129 | | 32.4 | 3.1 | | 18.8 | 34.4 | 2.7 | | 16.5 |
| 47 | $n$-$C_7F_{15}CH_2CHI(CH_2)_3CO_2C_2H_5$ | Oil | | 28.2 | 2.2 | 44.6 | | 31.2 | 2.7 | 40.8 | |
| | $n$-$C_7F_{15}(CH_2)_5CO_2H$ | ¹63.8–64.8 | | 32.2 | 2.3 | | | 32.2 | 2.3 | | |
| 48 | $n$-$C_7F_{15}CH_2CHI(CH_2)_3O_2CCH_3$ | 93/0.25 | 1.3898 | 27.0 | 1.9 | | 20.6 | 27.3 | 2.2 | 46.0 | 20.3 |
| 49–50 | $(CF_3)_2CF$—$CH_2CHI(CH_2)_8CO_2C_2H_5$ | 125/0.5 | 1.4300 | 37.8 | 4.8 | 26.2 | 25.0 | 37.8 | 4.8 | 25.8 | 24.7 |
| 51 | $n$-$C_3F_7$—[$CH_2CH$—$CO_2C_2H_5$]$_8$ ave.—I | (³) | 1.4523 | 47.0 | 5.9 | 12.1 | 11.6 | 49.4 | 6.5 | 10.5 | 9.7 |
| | | | MW Calc'd., 1096; MW Found, 1080 | | | | | | | | |
| 52 | $n$-$C_3F_7$—[$CH_2$—$CH=CClCH_2$]$_m$—I | (³) | | | | | | | | | |
| 53 | $n$-$C_3F_7$—[$CH_2$—$CH=CH$—$CH_2$]$_m$—I, m=1; m=2 | 50/5 | 1.4163; 1.4478 | | | 32.9 | 31.4 | | | 32.7 | 27.4 |
| | | | MW Calc'd., 404; Found, 406 | | | | | | | | |
| 54 | $n$-$C_3F_7$—[$CH_2CH$—$C_6H_5$]$_n$—I  n=2 | | | | | | 25.2 | | | | 10.0 |
| | | | MW Calc'd., 504; Found, 506 | | | | | | | | |
| 55 | $n$-$C_3F_7$—[$CH_2$—$CH$—CONHCH$_2$NHCO]—I; $n$-$C_3F_7$—[$CH_2CHI(CH_2)_8$—]$_m$ | ¹233 | | | | | | 47.8 | 6.2 | 17.2 | 12.9 |
| 56 | $(CF_3)_2CF(CF_2)_2CH_2CHI(CH_2)_8CO_2$*; $(CF_3)_2CF(CF_2)_2(CH_2)_{10}CO_2C_2H_5$; $(CF_3)_2CF(CF_2)_2(CH_2)_{10}CO_2H$ | Oil; 123/0.4; ¹43 | 1.4192; 1.3803; | 44.8; 42.3 | 5.2; 4.7 | ; 46.0 | | 46.0; 42.5 | 5.4; 4.7 | | |
| 57 | $(CF_3)_2CF(CF_2)_4CH_2CHI(CH_2)_8CO_2$*; $(CF_3)_2CF(CF_2)_4(CH_2)_{10}CO_2C_2H_5$; $(CF_3)_2CF(CF_2)_4(CH_2)_{10}CO_2H$ | Oil; 153/0.6; ¹63 | 1.4013; 1.3730; | 41.3; 39.0 | 4.3; 3.8 | 48.9; 51.4 | | 41.3; 39.2 | 4.6; 3.9 | | |
| 58 | $(CF_3)_2CF(CF_2)_6CH_2CHI(CH_2)_8CO_2$*; $(CF_3)_2CF(CF_2)_6(CH_2)_{10}CO_2C_2H_5$; $(CF_3)_2CF(CF_2)_6(CH_2)_{10}CO_2H$ | Oil; ¹40; ¹88 | 1.3979; | 38.7; 36.7 | 3.7; 3.2 | ; 55.2 | | 39.6; 37.1 | 4.0; 3.4 | | |

Table II—Continued
PRODUCTS—Continued

| Example No. | Product | b.p./mm. | $n_D^{25}$ | Calculated C | Calculated H | Calculated F | Calculated I | Found C | Found H | Found F | Found I |
|---|---|---|---|---|---|---|---|---|---|---|---|
| 59 | n-C₄F₉CF—CH₂CHI(CH₂)₈CO₂C₂H₅<br>\|<br>CF₃ | Oil | 1.4041 | 34.7 | 3.7 | 37.5 | 19.3 | 36.0 | 4.4 | | 19.1 |
| | n—C₄F₉CF(CH₂)₁₀CO₂C₂H₅<br>\|<br>CF₃ | 129/1.0 | 1.3743 | 42.9 | 4.7 | | | 43.3 | 4.5 | | |
| | n-C₄F₉CF(CH₂)₁₀CO₂H<br>\|<br>CF₃ | 150/1.0 | 1.3761 | 40.5 | 4.2 | 49.0 | | 40.8 | 4.1 | 48.3 | |
| 60 | Cl(CF₂)₂CH₂CHIO₂CCH₃ | 32/0.1 | 1.4404 | 20.7 | 1.7 | 10.2<br>Cl | 36.4 | 21.4 | 1.9 | 10.3<br>Cl | 36.4 |
| 61 | Br(CF₂)₂CH₂CHIO₂CCH₃ | 42/0.3 | 1.4609 | 18.3 | 1.5 | 19.4 | 32.3 | 19.0 | 1.9 | | |
| 62 | n-C₃F₇CH₂CHICH₂CN | 47/0.2 | 1.4148 | 23.2 | 1.4 | 36.6 | N 3.9 | 24.1 | 1.5 | 36.2 | N 4.6 |
| 63 | n-C₃F₇⎡CH=C⎤I n=1<br>\|  \|    n=2<br>  C₆H₅ᵐ | 50/0.6 | 1.4802<br>1.5409 | | | | 31.9<br>25.4<br>MW, Calc'd., 500; Found, 508. | | | | 30.9<br>23.5 |
| 64 | n-C₃F₇CH=CI(CH₂)₈CO₂H | Oil | 1.4442 | | | 27.8 | 26.5 | | | 25.8 | 25.9 |
| 65 | n-C₃F₇—C=CIC₂H₅*<br>\|<br>C₂H₅ | Oil | 1.4317 | | | | 33.5 | | | | 28.8 |
| 66 | n-C₃F₇CH=CICO₂CH₃ | 42/2 | 1.4098 | 22.1 | 1.1 | 35.0 | 33.4 | 22.3 | 1.6 | 36.9 | 33.9 |
| 67 | n-C₇F₁₅CH=CICO₂CH₃ | 58/1 | 1.3817 | 22.8 | 0.69 | 49.2 | 23.0 | 23.0 | 0.7 | 49.0 | 22.1 |
| 68 | n-C₇F₁₅CH=CICO₂H | 130/1 | ¹ 57–61 | | | | | | | | |

¹ M.P., degrees.  ² Viscous oil.  ³ Polymer, viscous oil.
*C₂H₅.

EXAMPLE 69

Sodium hydroxide (8.0 g., 0.2 mole) was added over a period of one-half hour (while protected from the atmosphere) to a stirred solution of $$C_3F_7CH_2CHICH_2O_2CCH_3$$

(41 g., 0.1 mole, see Examples 30 to 32) in 100 ml. of ether at 24° C. (some heat produced). When the addition was complete the mixture was stirred and heated under reflux for five hours, the solution becoming orange during that period. The solid material was then collected by filtration and washed with ether (22.8 g. of solid). The combined ether solutions were distilled giving

(10.8 g.), B.P. 62–63°/131 mm., $n_D^{25}$ 1.3150. An intermediate fraction, 13.9 g., B.P. 65–140.5°/131 mm. was shown to contain 80% epoxide by vapor phase chromatography. $C_3F_7CH_2CHICH_2O_2CCH_3$ (10.0 g.), B.P. 98–99/20 mm., $n_D^{25}$ 1.4004 was also recovered. The yield of epoxide was 78% at 61% conversion.

*Analysis of epoxide.*—Calcd. for $C_6F_7H_5O$: C, 31.9; H, 2.2; F, 58.8. Found: C, 32.5; H, 2.5; F, 58.8.

The surface tension of aqueous solutions of $$C_3F_7CH=CI(CH_2)_8CO_2H$$

as the sodium salts are as follows:

| (a) Conc. (wt. percent) | 0.40 | 0.20 | 0.10 | 0.05 | 0.025 |
|---|---|---|---|---|---|
| (b) γ 25 dynes/cm H₂O corrected | 20.3 | 20.9 | 23.2 | 25.7 | 27.7 |

| (a) Conc. (wt. percent) | 0.014 | 0.007 | 0.0035 | 0.0006 |
|---|---|---|---|---|
| (b) γ 25 dynes/cm H₂O corrected | 28.5 | 28.6 | 29.8 | 32.0 |

It is readily apparent that the present process is less time consuming than either the thermal or photochemical processes and that products can be prepared by this process which cannot be prepared by either the thermal or photochemical processes, e.g., $R_fCH_2CHIO_2CCH_3$. This process is also much more readily carried out in a continuous manner than the thermal or photochemical processes.

It is understood that the preceding representative examples may be varied, within the total present disclosure as understood and practiced by one skilled in the art, and substantially the same results obtained.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A composition having the structure $F(C_nF_{2n})Q$ wherein Y is selected from the group consisting of hydrogen, fluorine, chlorine and bromine, n is an integer from one to about twenty and Q is selected from the group consisting of (a) —CH₂CHIO₂CR (b) —CH₂CHI(CH₂)ₘO(CH₂)₂CO₂H (c) —CH=CH(CH₂)ₘO(CH₂)₂CO₂H (d) —CH₂CH₂(CH₂)ₘO(CH₂)₂CO₂H and (e) —CH=CI(CH₂)ₘCO₂H wherein R of (a) is a lower alkyl group and m of (b), (c), (d) and (e) is an integer of from zero to about fourteen.

2. A composition having the structure $$F(C_7F_{14})CH_2CHIO_2CCH_3$$

3. A composition having the structure $$F(C_{11}F_{22})CH_2CHIO_2CCH_3$$

4. A composition having the structure $$F(C_7F_{14})CH_2CHICH_2O(CH_2)_2CO_2H$$

5. A composition having the structure $$F(C_7F_{14})CH=CHCH_2O(CH_2)_2CO_2H$$

6. A composition having the structure $$F(C_7F_{14})CH_2CH_2CH_2O(CH_2)_2CO_2H$$

7. A process for reacting a polyfluoroalkyl iodide with a reactant taken from the group consisting of aliphatic olefins and acetylenes, said iodide having the structure selected from the group consisting of A—CFI—B and $I(C_rF_{2r})I$, said A and B being selected from the group consisting of F and $Y(C_nF_{2n})$, said Y being selected from the group consisting of F, Cl, Br, and H, said r being from 3 to about 20 and said n being from about 1 to about 20, said process being one wherein said polyfluoroalkyl iodide is reacted with an unsaturated compound taken from the group consisting of an aliphatic olefin, and an acetylene compound, said heating step being conducted at a temperature in the range of from about 50° C. to about 190° C. in the presence of a free radical generating compound selected from the group consisting of organic peroxides and organic azonitriles at a pressure of from about 1 to about 50 atmospheres, followed by recovering the reaction product.

References Cited in the file of this patent

UNITED STATES PATENTS

| | | |
|---|---|---|
| 2,858,331 | Fenske et al. | Oct. 28, 1958 |
| 2,972,638 | Tiers | Feb. 21, 1961 |
| 2,975,220 | Hauptschein et al. | Mar. 14, 1961 |

OTHER REFERENCES

Henne: J. Am. Chem. Soc. 73, 1791–1792 (1951).

Haszeldine et al.: J. Chem. Soc. (London), 1953, 1199–1206.